(12) United States Patent
Stöcklin

(10) Patent No.: US 11,116,128 B2
(45) Date of Patent: Sep. 14, 2021

(54) DISTRIBUTION MACHINE

(71) Applicant: RAUCH LANDMASCHINENFABRIK GMBH, Sinzheim (DE)

(72) Inventor: Volker Stöcklin, Ringsheim (DE)

(73) Assignee: RAUCH LANDMASCHINENFABRIK GMBH, Sinzheim (DE)

(*) Notice: Subject to any disclaimer, the term of this patent is extended or adjusted under 35 U.S.C. 154(b) by 167 days.

(21) Appl. No.: 16/082,341

(22) PCT Filed: Mar. 9, 2017

(86) PCT No.: PCT/EP2017/000311
§ 371 (c)(1),
(2) Date: Sep. 5, 2018

(87) PCT Pub. No.: WO2017/153046
PCT Pub. Date: Sep. 14, 2017

(65) Prior Publication Data
US 2019/0075718 A1 Mar. 14, 2019

(30) Foreign Application Priority Data
Mar. 9, 2016 (DE) .................... 10 2016 002 827.0

(51) Int. Cl.
*A01C 17/00* (2006.01)
(52) U.S. Cl.
CPC .......... *A01C 17/008* (2013.01); *A01C 17/001* (2013.01); *A01C 17/006* (2013.01)

(58) Field of Classification Search
CPC ............................. A01C 17/006; A01C 17/008
USPC ................................. 239/214–224, 560–689
See application file for complete search history.

(56) References Cited

U.S. PATENT DOCUMENTS 2,489,171 A * 11/1949 Balduf .................. A01C 17/00
239/665
3,010,727 A * 11/1961 Swenson ................. B60P 1/165
239/657

(Continued)

FOREIGN PATENT DOCUMENTS

DE    40 12 826 A1    10/1991
DE    41 34 315 A1    4/1993

(Continued)

*Primary Examiner* — Viet Le
(74) *Attorney, Agent, or Firm* — McGlew and Tuttle, P.C.

(57) ABSTRACT

A distribution machine, in the form of a spreader or a seed drill, includes a container carried by a support frame for receiving pulverent or particulate material to be distributed. An outlet opening is arranged on a floor of the container. A metering member is arranged downstream of the outlet opening. A ground distribution member is arranged downstream of the metering member. A displaceable part, such as a metering slide of the metering member or a device, adjusts the delivery point of the material to be distributed onto the distribution member. The displaceable part is operatively connected to, and actuated by, an output shaft of an electromotive rotary drive, a servomotor or a transmission output shaft of a transmission, arranged downstream of the electromotive rotary drive such that the exclusively rotational movement of the output shaft or of the transmission output shaft is transmissible to the displaceable part.

19 Claims, 5 Drawing Sheets

(56) References Cited

U.S. PATENT DOCUMENTS

| | | | | |
|---|---|---|---|---|
| 3,206,215 A * | 9/1965 | De Jong | A01C 3/063 | 239/651 |
| 3,210,084 A * | 10/1965 | Van Der Lely | A01C 15/008 | 47/1.7 |
| 3,419,222 A * | 12/1968 | Lepp | A01C 3/063 | 239/681 |
| 3,643,872 A * | 2/1972 | Smith | A01C 15/008 | 239/655 |
| 3,682,395 A * | 8/1972 | Van Der Lely | A01M 7/006 | 239/666 |
| 3,993,225 A * | 11/1976 | Manni | B65G 65/4827 | 222/324 |
| 4,157,150 A * | 6/1979 | Hetrick | E01C 19/2005 | 198/670 |
| 4,185,782 A * | 1/1980 | Belrose | A01C 15/02 | 239/222.11 |
| 4,199,108 A * | 4/1980 | Baumgartner | F27D 1/1673 | 239/662 |
| 4,234,131 A * | 11/1980 | Baker | A01C 17/00 | 239/685 |
| 4,238,076 A * | 12/1980 | Weiss | F27D 1/1673 | 239/676 |
| 4,277,205 A * | 7/1981 | Meunier | C03B 3/00 | 406/123 |
| 4,351,481 A * | 9/1982 | Dreyer | A01C 15/007 | 239/670 |
| 4,609,153 A * | 9/1986 | van der Lely | A01C 17/008 | 222/482 |
| 4,676,690 A * | 6/1987 | Allen | E01C 19/2035 | 222/196 |
| 4,725,005 A * | 2/1988 | Wiegelmann | A01C 17/001 | 239/682 |
| 4,763,844 A * | 8/1988 | van der Lely | A01C 17/008 | 239/665 |
| 4,785,976 A * | 11/1988 | Bennie | A01C 15/16 | 222/370 |
| 4,842,202 A * | 6/1989 | van der Lely | A01C 17/005 | 239/661 |
| 4,991,781 A * | 2/1991 | Barbieri | A01C 17/001 | 239/661 |
| 5,082,186 A * | 1/1992 | Bruns | A01D 41/1243 | 239/667 |
| 5,139,044 A * | 8/1992 | Otten | A01G 25/16 | 137/80 |
| 5,145,116 A * | 9/1992 | Shaver | A01C 17/006 | 239/665 |
| 5,234,128 A * | 8/1993 | Hill | E01C 19/2005 | 222/52 |
| 5,244,129 A * | 9/1993 | Poussin | B65G 69/0458 | 222/410 |
| 5,842,649 A * | 12/1998 | Beck | A01C 15/008 | 239/677 |
| 6,024,305 A * | 2/2000 | McFarlane | A01C 3/06 | 239/658 |
| 6,047,909 A * | 4/2000 | Simpson | A01C 15/006 | 239/600 |
| 6,116,526 A * | 9/2000 | Bom | A01C 17/006 | 239/657 |
| 6,206,306 B1 * | 3/2001 | McFarlane | A01C 3/06 | 239/658 |
| 6,270,020 B1 * | 8/2001 | Thompson | E01H 10/005 | 239/172 |
| 6,293,438 B1 * | 9/2001 | Woodruff | G01F 11/24 | 222/342 |
| 6,499,679 B1 * | 12/2002 | Woodruff | A01C 15/02 | 239/650 |
| 7,044,408 B2 * | 5/2006 | Schoenfeld | A01C 17/001 | 239/659 |
| 7,063,280 B1 * | 6/2006 | Bogart | A01C 17/008 | 239/505 |
| 7,222,583 B2 * | 5/2007 | Foster | A01K 5/0225 | 119/57.91 |
| 7,306,175 B1 * | 12/2007 | Farmer | A01C 17/001 | 239/223 |
| 7,780,097 B2 * | 8/2010 | Puck | A01C 23/003 | 137/625.11 |
| 7,954,454 B2 * | 6/2011 | Lewis | A01K 5/0291 | 119/57.91 |
| 8,511,589 B2 * | 8/2013 | Richardson | E01H 10/007 | 239/662 |
| 9,649,646 B1 * | 5/2017 | Podoll | A01C 17/008 | |
| 10,088,059 B2 * | 10/2018 | Dubiel | F16K 3/085 | |
| 10,582,656 B2 * | 3/2020 | Beal | A01C 15/007 | |
| 2003/0146309 A1 * | 8/2003 | Berner | A01C 17/001 | 239/681 |
| 2003/0146727 A1 * | 8/2003 | Ishii | H02K 29/08 | 318/652 |
| 2005/0258284 A1 * | 11/2005 | Magnusson | A01C 17/008 | 239/687 |
| 2007/0012799 A1 * | 1/2007 | Kendall | A01C 17/001 | 239/146 |
| 2011/0015832 A1 * | 1/2011 | Hoyle | A01C 17/008 | 701/50 |
| 2011/0220742 A1 * | 9/2011 | Sandler | E01C 19/203 | 239/661 |
| 2012/0168539 A1 * | 7/2012 | Kim | A01C 17/006 | 239/663 |
| 2012/0193457 A1 * | 8/2012 | Gosselin | A01C 15/122 | 239/663 |
| 2013/0186988 A1 * | 7/2013 | Dube | A01C 23/003 | 239/672 |
| 2013/0193242 A1 * | 8/2013 | Giletta | E01H 10/007 | 239/668 |
| 2013/0233938 A1 * | 9/2013 | Norkus | E01H 10/007 | 239/7 |
| 2014/0097264 A1 * | 4/2014 | Detweiler | A01M 11/00 | 239/1 |
| 2014/0131485 A1 * | 5/2014 | Kowalchuk | A01C 21/00 | 239/663 |
| 2014/0231553 A1 * | 8/2014 | Truan | E01C 19/203 | 239/661 |
| 2014/0374515 A1 * | 12/2014 | Truan | A01C 17/006 | 239/669 |
| 2015/0136870 A1 * | 5/2015 | Myers | A01C 15/02 | 239/7 |
| 2015/0336118 A1 * | 11/2015 | Myers | A01M 25/006 | 239/684 |
| 2016/0010295 A1 * | 1/2016 | Boschung | B65D 88/62 | 239/650 |
| 2016/0017551 A1 * | 1/2016 | Wendorff | E01C 19/203 | 239/675 |
| 2016/0095276 A1 * | 4/2016 | Roberge | A01C 7/122 | 239/8 |
| 2016/0106028 A1 * | 4/2016 | Kendall | A01C 17/008 | 239/1 |
| 2016/0114341 A1 * | 4/2016 | Hazelton | A01C 17/008 | 239/666 |
| 2016/0150724 A1 * | 6/2016 | Browning | A01C 21/002 | 239/1 |
| 2016/0374267 A1 * | 12/2016 | Reinecke | A01D 41/1243 | 239/1 |
| 2017/0142900 A1 * | 5/2017 | Mahieu | A01C 17/008 | |
| 2018/0169681 A1 * | 6/2018 | Stewart | A01C 17/008 | |
| 2018/0235142 A1 * | 8/2018 | Schoels | A01C 7/085 | |
| 2018/0235143 A1 * | 8/2018 | Zeitvogel | A01C 15/16 | |
| 2019/0075718 A1 * | 3/2019 | Stocklin | A01C 17/001 | |
| 2019/0116724 A1 * | 4/2019 | Lefebvre | A01C 17/001 | |
| 2019/0200513 A1 * | 7/2019 | Wu | A01C 17/008 | |
| 2020/0000019 A1 * | 1/2020 | Stocklin | A01C 19/02 | |
| 2020/0188947 A1 * | 6/2020 | Sevrey | A01C 17/008 | |

FOREIGN PATENT DOCUMENTS

| | | |
|---|---|---|
| DE | 41 05 059 C2 | 7/1999 |
| DE | 199 39 169 A1 | 2/2001 |
| DE | 100 33 674 A1 | 1/2002 |
| DE | 10 2005 015 228 A1 | 10/2006 |
| DE | 10 2013 104 024 A1 | 11/2014 |

(56) References Cited

FOREIGN PATENT DOCUMENTS

| | | |
|---|---|---|
| DE | 20 2013 009 703 U1 | 11/2014 |
| EP | 0 222 337 B1 | 2/1992 |
| EP | 0 489 674 B1 | 1/1995 |
| EP | 0 682 857 B1 | 7/1999 |
| EP | 1 145 614 B1 | 7/2004 |
| EP | 2 057 876 A1 | 5/2009 |
| EP | 2 301 316 A1 | 3/2011 |
| EP | 2 454 928 B1 | 10/2013 |
| EP | 2 727 449 A1 | 5/2014 |

* cited by examiner

DISTRIBUTION MACHINE

CROSS REFERENCE TO RELATED APPLICATIONS

This application is a United States National Phase Application of International Application PCT/EP2017/000311, filed Mar. 9, 2017, and claims the benefit of priority under 35 U.S.C. § 119 of German Application 10 2016 002 827.0, filed Mar. 9, 2016, the entire contents of which are incorporated herein by reference.

TECHNICAL FIELD

The invention relates to a distribution machine, in particular to a spreader and/or a seed drill, having at least one container which is carried by a support frame for receiving pulverent and/or particulate material to be distributed, at least one outlet opening which is arranged on the floor of the container, a metering member which is arranged downstream of the outlet opening and at least one distribution member which is arranged downstream of the metering member for distributing the material to be distributed on the ground.

BACKGROUND

Distribution machines of the aforementioned type are known in multiple designs, predominantly on the one hand in the form of agricultural spreaders for delivering pulverent or particulate material, such as in particular fertilizer or seed material, thus for example in a design that is towed or received by a three-point hitch of a towing machine, such as a tractor. Such distribution machines include a container which receives the material to be distributed, on the floor of which one or two outlet openings are usually arranged, the respective outlet opening having assigned thereto a metering member in order to remove the material to be distributed from the container in the desired quantity—or more precisely: at the desired mass flow. The metering member can be opened and closed in a controlled manner by means of a suitable actuating member in the form of a hydraulic or electric cylinder in order to be able to adjust the desired mass flow depending on the desired distribution width of the material to be distributed on the ground, depending on the travel speed and depending on the physical characteristics of the material to be distributed, such as, for example, the pourability thereof. A distribution member is situated below the metering member, by means of which metering member the material to be distributed is distributed over the desired operating width. Some distribution machines, moreover, are designed with a device for adjusting the delivery point of the material to be distributed onto the distribution member which is formed in particular by a distributing disk which is provided with throwing vanes, it being possible to adjust the delivery point, with reference to the distributing disk, radially (in particular to increase/decrease the spread pattern) and/or in the circumferential direction (in particular to rotate the spread pattern a little about the rotational axis of the distributing disk). Such an agricultural distribution machine is disclosed, for example, in DE 10 2005 015 228 A1.

On the other hand, generic distribution machines are known in the form of winter service spreaders where the container serves principally for receiving grit and/or road salt which, as a rule, are granular, the function of such a winter service spreader corresponding extensively to that of the above-described agricultural spreader.

When delivering the material to be distributed—whether it be in the form of fertilizer or seed material on a field or in the form of grit or salt on a road—as a rule large quantities of particles of soil, sand, dust and the like are whirled up which can pass, in particular, onto the metering members arranged below the container and the actuating cylinders thereof as well as onto the frequently present device for adjusting the delivery point of the material to be distributed onto the distribution members or the actuating cylinders thereof, as a result of which, depending on the quality and size of the particles, the function can be impaired. This applies, as said, in particular with reference to the actuating cylinders of the metering members and—if present—to the actuating cylinders of the device for adjusting the delivery point of the material to be distributed onto the distribution member, insofar as larger particles including small stones get jammed there. Furthermore, the material to be distributed, which is present also as powder or particles, frequently tends to accumulate, in particular, on the functional parts of the aforementioned type situated below the container, the predominantly solid fertilizer and also road salt having, in particular, a hygroscopic character such that they stick together in conjunction with air moisture or even rain or snow (slush) and, as the delivery continues, adhere to the functional parts in more or less hard accumulations. This applies in particular—if not exclusively—when the distribution members are formed by spreader or distribution disks which fling the pulverent or particulate material radially past the functional parts.

EP 2 727 449 A1 tackles this problem in the case of a generic distribution machine with a cleaning device which is arranged below the container and is provided with a plurality of fluid nozzles. This does provide decisive advantages— also with regard to cleaning the metering members themselves or the distribution members, but the contamination of the actuating cylinders during operation which occurs increasingly between the cleaning operations carried out nevertheless presents a problem with regard to its functional reliability and maintenance safety as well as to its necessary robustness.

Insofar as said actuating cylinders provided for driving the metering members and the, if present, device for adjusting the delivery point of the material to be distributed on the distribution member are hydraulic cylinders, the translatory movement of the piston rod of which being converted by means of suitable lever linkage into a translatory or a rotational movement of a respective displaceable functional part of the device for adjusting the delivery point and/or of a metering slide of the metering member, as is frequently used on account of its simple connection to the hydraulic system of a tractor, it is additionally necessary, on the one hand, on account of the aggressive environmental conditions, to produce at least the piston rods of the hydraulic cylinders from very hard and chemically resistant materials, such as chrome-plated stainless steel, and on the other hand, very high demands are made on the sealing elements used for sealing the piston rods against the cylinders as the piston rods are continuously pushed out of the cylinder or into said cylinder during operation, although sometimes only slightly, as a result of which there is the risk of importing foreign bodies which adhere to the piston rod and/or moisture into the interior of the hydraulic cylinder. Furthermore, for ensuring the hydraulic cylinders operate in a fault-free and low-wear manner, there ought to be an oil film on the piston rod thereof, which oil film however, on account of its adhesive character, on the other hand increases the risk of contaminants caking and consequently of them being imported into the internal oil circuit. Furthermore, the piston rod, which is extended out of the hydraulic cylinder at least in part, can also be exposed to aggressive environmental conditions for months even outside the—in the case of generic distribution machines usually seasonal—operation such that corrosion occurs in spite of the costly and inert materials. DE 10 2013 104 024 A1 attempts to counter said problem, for example, by providing a protective housing for the hydraulic cylinder, but a fault-free seal is difficult here too and what has been said above also applies to the necessary materials and the robustness of the hydraulic cylinder.

Finally, in the case of metering members which comprise a metering slide which is displaceable relative to the outlet opening of the container serving for storing the material to be distributed, in the event of the metering slide being driven by means of a hydraulic cylinder, there is a further problem to the effect that, to adjust a desired metering rate (corresponding to a certain open position of the metering slide relative to the outlet opening) by means of a graduation and a fixing system, a stop which corresponds to the desired open position of the metering slide has to be adjusted, against which stop the hydraulic cylinder can then move. A certain metering rate or a certain mass flow of material to be adjusted can certainly be adjusted in this way, but cannot be changed when, for example, the speed changes in relation to the originally calculated speed (and a higher or lower metering rate would be necessary as a result).

For this reason, modern distribution machines frequently use electric cylinders in place of hydraulic cylinders to drive the metering slides of the metering members and, where applicable, the devices for adjusting the delivery point of the material to be distributed onto the distribution members, the translatory movement of the piston rod of which is converted in a corresponding manner as in the case of hydraulic cylinders by means of suitable lever linkages into a translatory or into a rotational movement of a respective displaceable functional part of the device for adjusting the delivery point and/or of a metering slide of the metering member. Such electric cylinders are frequently provided with position sensors in order to detect the precise position of extension of the piston rod with reference to the cylinder, which is representative of the open position of the metering member or of the position of the delivery point, and to utilize this in particular for control purposes (DE 40 12 826 A1 or DE 41 34 315 A1).

However, the aggressive dusts or particles of mineral fertilizer, salt or also other contaminants which act from outside on the actuating members of the metering members or of the devices for adjusting the delivery point onto the distribution members in the case of generic distribution machines also provide a not insignificant functional problem in the case of electric cylinders.

Thus, for example, when retracting the piston rod into or when pushing the same out of the electric cylinder, an overpressure or negative pressure is generated in the interior of the cylinder which is able to be compensated for outward by means of suitable valves in the case of generic applications, which is, however, hardly possible in the case of distribution machines because, as a result of the valve, environmental dusts and/or moisture could penetrate into the cylinder and result in corrosion. On the other hand, the negative pressure prevailing in the interior of the cylinder with the piston rod in the extended state once again harbors the risk of dust and/or moisture being sucked in such that—as also in the case of hydraulic cylinders—a very high level of tightness has to be ensured, which is only possible in practice using very costly special seals. Insofar as crusted or hardened accumulations have formed on the piston rod, they must be securely destroyed and detached additionally by effective mechanical scrapers in order not to damage such special seals and to maintain the high level of tightness. The high level of tightness, in this case, also in this respect, is more significant precisely in the case of electric cylinders because the position sensor system for detecting the current position of extension of the piston rod is usually housed in the interior of the cylinder, which position sensor system includes, for example, an open sliding contact which detects the position of extension of the piston rod in a precise manner. In the case of penetrated—solid and/or liquid—contaminants, such position sensors, however, suffer damage, whether it be as a result of mechanical impairment or as a result of corrosion, such that the positional detection becomes inaccurate or entirely ineffective such that malfunctions with regard to the metering rate and/or the delivery point are produced.

This also applies extensively to the case of electromotive spindle drives of the displaceable functional parts of generic distribution machines, such as the metering slide of the metering member or the device for adjusting the delivery point of the material to be distributed onto the distribution member, where the spindle which is movable in and out of the motor housing in a translatory manner once again runs the risk of bringing particulate or fluid contaminants into the motor housing and of damaging the electric motor itself or the sensors thereof, the named contaminants being deposited in a particularly stubborn manner in the helical spindle thread and in practice no longer being able to be detached in continuous operation.

Such an electromotive spindle drive, provided with a transmission, of a rotatably mounted metering slide of a metering member of a disk spreader can be found, for example, in DE 41 05 059 C2, a lever which connects said spindle to the metering slide being pivotally mounted on the free end of the spindle which is displaceable in a translatory manner and a position detection sensor being assigned to the electromotive spindle drive. EP 0 222 337 B1 describes a further disk spreader with a device, which includes a chute which is displaceable in a translatory manner and is arranged below the metering members, for adjusting the delivery point of the material to be distributed onto the distribution members, which can be actuated in dependence on the set mass flow of material to be distributed by means of the metering members to reduce the so-called mass effect. Whilst the metering members comprise a rotationally-driven metering roller which is connectable to the power take-off shaft of a tractor, the chutes of the device for displacing the delivery point are once again connected to an electromotive spindle drive by means of a lever linkage.

In the case of all the functional impairments triggered by the above problems, the distribution machine comes to a compulsory operational standstill which, as a rule, cannot be made into a type of manual emergency operation. Since generic distribution machines are used almost exclusively in a seasonal manner and usually only a short time window is available for their necessary use (whether it be in the case of seasonal fertilizing with the planting in a predefined state or snow falling suddenly), such failures of the distribution machine should be avoided if at all possible.

A further problem of the electric cylinders or spindle drives used for actuating the metering slide of the metering members and/or the device for adjusting the delivery point of the material to be distributed on the distribution member of generic distribution machines is that on account of the increasing size (or increasing working widths) and increasing speeds and increasing automation processes, faster and faster intake and outtake speeds of the piston rod into and out of the electric cylinder or of the adjustment spindle into and out of the motor housing are necessary. Since the efficiency of both electric cylinders and spindle drives is low on account of the enormous effort required for the usually friction-intense spindle drive, there is consequently an ever-increasing requirement for available electric power. This is not only disadvantageous with regard to a high level of electric energy consumption, but also in particular with regard to the fact that the electric cylinders or spindle drives of generic distribution machines have to be supplied as a rule by the onboard power system of the towing machine, only a 12 V power supply being available in the majority of cases both in agricultural technology and in the case of conventional road vehicles. If the distribution machine is in particular such a machine with electric or electronic control and/or regulation of multiple functions of the distribution machine, there can be up to six electric actuating drives (two each for the metering members, the devices for adjusting the delivery point and, where applicable, for agitators) which during simultaneous operation together with the control/regulating technology itself and with a control unit which is usually assigned thereto, require a very high level of electric power. This can result in very high currents up to a breakdown of the onboard power system or to an emergency shutdown by means of the safety devices, which means that there is a requirement to increase the low level of efficiency of electric actuating cylinders or electric spindle drives.

With reference to the structural design of devices for adjusting the delivery point of the material to be distributed onto the distribution disks, there are essentially three realization variants known, which include a rotatable bearing arrangement of a floor which is provided with the outlet opening out of the container;

a bearing arrangement, which is rotatable in a coaxial manner with the distribution member, of a sleeve arranged downstream of the metering member with a radial delivery opening onto the distribution member; or a rotatable bearing arrangement of a chute which is arranged downstream of the metering member.

With regard to the first-named alternative, for example EP 2 057 876 A1 describes a distribution machine in the form of a twin disk spreader, the two distribution disks of which each have assigned thereto a device for adjusting the delivery point of the material to be distributed, each of which includes a rotatable floor which is provided in each case with an outlet opening of the container. The rotatable floors are each driven by means of an electric cylinder which are actuatable separately from one another or by means of one common electric cylinder and a corresponding lever system. In order to protect the electric cylinders as far as possible against external influences, such as, in particular, grains of fertilizer, they are arranged approximately transversely to the direction of travel of the distribution machine in a central region between the distribution disks and are offset forward in the direction of travel in relation to their axes such that they are largely protected from particles of fertilizer which are centrifuged by the distribution disks. This applies only in a limited manner, nonetheless, to finely powdered fertilizer dust which is distributed everywhere in practice, and to environmental contaminants including moisture.

With reference to the second alternative, EP 1 145 614 B1, for example, discloses a distribution machine which is once again in the form of a disk spreader and which includes a sleeve which is arranged directly above the surface of the distribution disk and is rotatable coaxially to said disk by means of an electric cylinder. The material to be distributed is supplied to the sleeve by means of the metering member and is delivered onto the surface of the distribution disk in the central region thereof via a radial delivery opening of the sleeve. Depending on the position of rotation of the sleeve, the delivery opening thereof is displaced in the circumferential direction of the distribution disk such that—in a similar manner to the above-described first alternative—the delivery point is adjusted in the circumferential direction of the distribution disk.

With reference to the third alternative, EP 0 489 674 B1, EP 0 682 857 B1 or EP 2 454 928 B1, for example, disclose distribution machines in the form of disk spreaders where the material to be distributed is delivered by means of the metering member of a rotatably mounted chute or channel. As a result of rotating the chute by means of an electric cylinder assigned thereto, the free end thereof is displaced relative to the fixedly mounted distribution disk in order to adjust the delivery point of the material to be distributed onto the distribution disk—in this case usually both in the radial and in the circumferential direction of the same.

SUMMARY OF THE INVENTION

An object underlying the invention is to develop a distribution machine of the type named in the introduction in a simple and cost-efficient manner to the effect that operating reliability is increased and preferably the power consumption also reduced whilst at least largely avoiding the aforenamed disadvantages even under the effect of aggressive pulverent or particulate materials including moisture or wetness in the case of extreme weather conditions.

This object is achieved according to the invention with a distribution machine of the type named in the introduction in that at least one displaceable functional part—of the metering member in the form of at least one metering slide and/or—of at least one device for adjusting the delivery point of the material to be distributed onto the distribution member is operatively connected to, and actuated by, an output shaft of an electromotive rotary drive or a transmission output shaft of a transmission which is arranged downstream of the electromotive rotary drive in such a manner that the exclusively rotational movement of the output shaft or of the transmission output shaft is transmissible to the displaceable functional part.

The design according to the invention of the actuating members of the metering slide of the metering member and/or of the device for adjusting the delivery point of the material to be distributed onto the distribution member initially eliminates all the problems with regard to the damaging caking of contaminants, such as particles of the material to be distributed, dirt and/or moisture, on the piston rod or adjusting spindle thereof connected with actuating members which include telescoping parts (i.e. both with the above-described actuating cylinders—whether they be hydraulic or electric—and with the spindle drives, the translatory movement back and forth of which is transmitted to the respective functional part), as the output shaft of the electromotive rotary drive according to the invention is arranged in an axially fixed manner and, by avoiding telescoping movements, the movement carried out, which is transmitted onto the displaceable functional part, is not translatory, but exclusively rotational. Furthermore, according to the invention there is also, in particular, transmission of the purely rotational movement or of the torque of the output shaft of the electromotive rotary drive or of the transmission output shaft to the functional part, which is itself displaceable—in a rotational or also translatory manner—by avoiding any telescopic movement transmission means which are displaceable in a translatory manner along piston/cylinder units or adjustment spindles.

Correspondingly, there is also simple sealing of the output shaft in relation to the electric motor or the transmission output shaft of a transmission housing by means of conventional seals. Furthermore, the electromotive rotary drive can be realized in a very compact and space-saving manner in the absence of any drive means that are movable back and forth in a translatory manner and is consequently suitable in an ideal manner for the very limited available installation space below the container, serving for storing the material to be spread, of generic distribution machines, such as in particular (twin) disk spreaders, the output shaft only being able to include, for example, one shaft stub, the rotational movement or the torque of which being transmitted to the respective functional part.

In addition, the effort required of the electromotive rotary drive, in the absence of any in particular telescopic drive means that are movable back and forth in a translatory manner, in relation to the prior art is clearly less and as a result the efficiency is clearly greater than that of electric cylinders or adjustment spindles such that the energy consumption is reduced and additionally there is no risk of overloading the onboard power system of the distribution machine itself or of a towing machine such as a tractor or a road vehicle. Correspondingly there is also less wear as a result of the lower necessary drive forces, which lengthens maintenance intervals and in particular minimizes the risk of breakdown during seasonal use just at the time when the distribution machine is required. Furthermore, very high actuating speeds can easily be achieved by the speed of the electromotive actuating drive, and as a result of its output shaft, be increased without this being able to be impaired by translatory retraction and extension movements, as occur in the case of a piston rod with reference to an electric cylinder or an adjustment spindle.

In order to transmit the exclusively rotational movement of the output shaft of the electromotive rotary drive or of the transmission output shaft of a transmission arranged downstream of said drive onto the displaceable functional part avoiding any movement transmission means which are displaceable in a translatory manner along piston/cylinder units or adjustment spindles, said functional part can preferably be connected (a) by way of at least one lever which is pivotally mounted eccentrically on the output shaft of the electromotive rotary drive or on the transmission output shaft, (b) non-rotatably to the output shaft or the transmission output shaft so as to be pivotable about a pivot axis which is arranged coaxially to the output shaft of the electromotive rotary drive or to the transmission output shaft, or (c) via meshing gear wheels or a belt drive, such as preferably in the form of a toothed belt drive, to the output shaft or the transmission output shaft so as to be pivotable about a pivot axis which is arranged at a radial distance to the output shaft of the electromotive rotary drive or to the transmission output shaft. In all cases, with low effort to transmit the force of the rotational movement of the output shaft or of the transmission output shaft to the displaceable functional part, very high adjustment speeds of the same are possible.

The displaceable functional part of the distribution machine, in particular when it is connected to at least one lever which is pivotally mounted eccentrically on the output shaft of the electromotive rotary drive or on the transmission output shaft, can basically be displaceable in a translatory manner or can itself be rotationally displaceable. In an advantageous design, in this case, it can be provided that the displaceable functional part is displaceable in a rotational manner by it being mounted so as to be pivotable or rotatable about a pivot or rotational axis, which is operatively connected to and actuated by the output shaft or the transmission output shaft, for example, by means of levers, non-rotatable connection to the output shaft or the transmission output shaft, meshing gear wheels or belt drives, preferably in the form of toothed belt drives.

As already mentioned, the electromotive rotary drive is expediently received in at least one housing in order to provide all the functional components of the same with as much protection as possible against external influences and in particular to prevent corrosion in a reliable manner following ingress of moisture and aggressive fine particles, such as particles of the material to be spread or of seed material from mineral fertilizers or road salt which are flung around during the spreading or seeding work. In this case, the electromotive rotary drive can be accommodated in particular in one single common housing or the electric motor and, where applicable, one or multiple transmissions connected downstream of said electric motor (see further below in this respect) can be accommodated in separate housings which are fastened on the housing of the electromotive rotary drive in order to ensure the components of the electromotive rotary drive are closed in on all sides, where applicable together with the transmission. The housing is configured for this purpose in particular so as to be substantially dust-tight and liquid-tight, the output shaft of the electromotive rotary drive or a transmission output shaft of a transmission arranged downstream of said electromotive rotary drive (see further below in this respect) being sealed against the housing, in particular by means of at least one mechanical seal.

As mentioned beforehand, in a preferred design it can additionally be provided that at least one transmission, in particular in the form of coupling gearing, coaxial gearing, angular gearing and/or planetary gearing, is arranged downstream of the electromotive rotary drive and is operatively connected on the one hand to the output shaft of the electromotive rotary drive, whilst the transmission output shaft thereof on the other hand is operatively connected to the displaceable functional part—of the metering member in the form of the metering slide and/or—of the device for adjusting the delivery point of the material to be distributed onto the distribution member.

On account of the fact that the transmission translates the rotational speed of the output shaft of the electromotive rotary drive to a (clearly) lower rotational speed, on the one hand an electric motor can be used with relatively low power, on the other hand the metering slide of the metering member and/or the device for adjusting the delivery point of the material to be distributed onto the distribution member can be actuated in a highly precise manner, as multiple revolutions of the output shaft of the electromotive rotary drive only bring about a part revolution of the transmission output shaft. The efficiency achievable with such a drive unit formed from the electromotive rotary drive and the transmission connected downstream is in the order of magnitude of at least 40% or more in the case of transmission according to the invention of the exclusively rotational movement of the output shaft to the displaceable functional part of the distribution machine; the overall transmission ratio can be, for example, in the order of magnitude of between approximately 500 and approximately 2000, preferably between approximately 750 and approximately 1500, in particular between approximately 750 and approximately 1250. Suitable transmission ratios for the transmission are, for example, approximately 800 with reference to the actuation of the metering slide of the metering member or approximately 900 with reference to the actuation of the device for adjusting the delivery point of the material to be distributed onto the distribution member. The choice of the type of transmission selected is principally based on the only very limited installation space available below the container in the case of generic distribution machines, planetary gearing, for example, having proved as expedient for actuation of the device for adjusting the delivery point of the material to be distributed onto the distribution member, whilst for actuation of the metering slide of the metering member in particular coupling or angular gearing or combinations of coupling or angular with coaxial gearing have been found to be suitable. As mentioned above with reference to the electromotive rotary drive, the transmission output shaft should be sealed expediently, in particular by means of at least one mechanical seal, against the in particular substantially dust-tight and liquid-tight transmission housing in order to prevent ingress of moisture and dirt, such as in particular fine particles of the material to be distributed.

In an additionally expedient design, it is provided that the output shaft of the electromotive rotary drive, the if present transmission output shaft or at least one other shaft of the transmission is provided with a position detection sensor, in particular in the form of—an angle sensor which is able to detect the angular position of the output shaft, of the transmission output shaft or of the at least one other shaft of the transmission, or—a speed sensor which is able to detect the number of revolutions of the output shaft, of the transmission output shaft or of the at least one other shaft of the transmission, which is connected to a control and/or regulating device of the distribution machine. Whilst such a sensor can also be arranged, in principle, outside the electromotive rotary drive or outside the transmission, such as, for example, on the functional part itself which is actuated thereby, the design according to the invention, in the absence of piston rods which are displaceable in a translatory manner such as, for example, are present in the case of electric cylinders or adjustment spindles on account of their very high long-term tightness, offers, in particular, the advantage of functionally reliable accommodation of the sensor in the housing of the electromotive rotary drive or in the transmission housing arranged downstream thereof or in the common housing such that the electromotive rotary drive unit can be designed substantially in the manner of a servomotor, for example in the form of a brushless direct current motor. The position detecting sensor of the electromotive rotary drive serves, in this case, for detecting the actual position of the functional part actuated thereby, in particular in real time such that the required position is able to be re-adjusted by means of the control and/or regulating device where applicable. Practically any known sensors which are able to detect the speed and/or the angular position of shafts can be considered as position detecting sensors. Inductance transmitters, Reed sensors, magnetostriction sensors and the like are mentioned in this context simply as an example.

The control and/or regulating device can also include, for example, a control board which can also be accommodated in the permanently tight housing of the electromotive rotary drive or also in a separate control module or operating terminal. It can have an input device expediently associated therewith in the normal manner in order to command the control and/or regulating device according to the desired adjustments of the metering slide of the metering member and/or of the delivery point of the material to be distributed onto the distribution member. The input device can be accommodated, for example, in the driver's cab of a towing machine, such as a tractor or a road vehicle, or can be formed by a portable operating terminal in order to provide the desired remote controllability in the normal manner.

Whilst, in principle, the electromotive rotary drive can also comprise its own power supply device, such as a battery, an accumulator or the like, it can preferably be supplied with power from the electric power supply of a towing machine, such as a tractor or a road vehicle. In said case, the electromotive rotary drive can comprise, in particular, an electric interface which is connectable to the electric power supply of the towing machine.

With regard to a displaceable functional part of the distribution machine in the form of the metering slide of the at least one metering member, according to a structurally simple and robust design which is provided for actuating the metering slide of the metering member by means of the motor rotary drive according to the invention, it can be provided in an advantageous design that the metering slide of the at least one metering member interacts with the outlet opening arranged in a floor of the container and is pivotable about a, in particular substantially vertical, pivot axis between a closed position, in which it closes the outlet opening completely, and a multitude of open positions in which it is open completely or in part.

The metering slide, in this connection, can be mounted preferably so as to be pivotable on the floor of the container which is provided with the outlet opening, said floor of the container being either fixed or in the case of a device for adjusting the delivery point of the material to be distributed onto the distribution element according to the above-described first alternative rotatable, a very space-saving arrangement being produced as a result of the bearing arrangement of the metering slide directly on the floor. In addition, it can be advantageous for the same purposes when the electromotive rotary drive is secured directly or if present indirectly by means of its transmission on the floor of the container provided with the outlet opening. The electromotive rotary drive and the transmission, whether they be accommodated in one common housing or in separate housings which are fastened together, can consequently also be secured directly on the floor of the container, a very small space requirement and an arrangement very close to the metering slide also being produced in order to keep the number of movable parts, which translate induced rotational movement mechanically into a pivoting movement of the metering slide by means of the electromotive rotary drive, as small as possible.

In said context, it can be provided, for example, that the output shaft of the electromotive rotary drive or if present the transmission output shaft—is arranged substantially coaxially to the pivot axis of the metering member or—is arranged parallel to the pivot axis of the metering slide, wherein the output shaft of the electromotive rotary drive or the transmission output shaft is connected to the metering slide by means of at least one, in particular only one, lever which is pivotally mounted hereon in an eccentric manner. Whilst in the first-named case consequently movable parts for mechanically translating the rotational movement of the output shaft of the electromotive rotary drive or of the transmission output shaft into a pivoting movement of the metering slide are unnecessary—rather, its rotational axis can be connected directly non-rotatably, but advantageously releasably, to the (transmission) output shaft, the last-named alternative offers, in particular in the case of very tight installation space, the possibility of an arrangement of the electromotive rotary drive somewhat further away from the pivot axis of the metering slide, but also requires simply preferably only one single lever which connects the output shaft of the electromotive drive or the transmission output shaft pivotably to the metering slide, the lever being pivotally mounted in each case eccentrically with reference to the (transmission) output shaft and with reference to the pivot axis of the metering slide without using any movement transmission means which are displaceable in a translatory manner along piston/cylinder units or adjustment spindles for this purpose.

Furthermore, it can be provided according to an advantageous further development that the metering slide has assigned thereto a handle, in particular substantially in the form of an operating handle which is arrangeable on the metering slide eccentrically to its pivot axis in order to be able to actuate the metering slide manually. The handle can extend, in this connection, in particular principally approximately in a crooked manner with reference to the pivot axis of the metering slide, that is to say with extension direction components that are perpendicular hereto and offset to said pivot axis and can be arranged either fixedly on the metering slide, or a correspondingly positioned receiving means, such as, for example, a bore, in particular on the metering slide, can be provided with tongues provided with bores or the like, with which the handle, realized as a separate operating part, can be moved where necessary into releasable actuating engagement. In this way it is possible, in the event of a failure of the electromotive rotary drive or of the power supply thereof, for example the onboard power supply of a towing machine, to displace the metering slide manually into its closed position in order to ensure the removal of the distribution machine without material to be distributed that is still situated in the container being able to trickle out through the metering member, which would cause not only economic but also environmental damage, but would also in particular represent a high safety risk with regard to a slip hazard if the material to be distributed were to pass onto public roads in the case of the usual shaking and vibration during travel. As the self-locking forces of usual electromotive rotary drives are smaller compared to (electric) piston/cylinder units, the electromotive drive does not necessarily have to be uncoupled from the metering slide for this purpose, but as a general rule the output shaft can be entrained.

With reference to a displaceable functional part of an advantageously provided device for adjusting the delivery point of the material to be distributed onto the distribution member of the distribution machine, the actuation thereof according to the invention by means of the electromotive rotary drive can be used in principle for all three realization variants of the above-depicted type disclosed up to now. Thus, according to a structurally simple and robust design of the actuation of the device for adjusting the delivery point, it can be provided that the displaceable functional part, actuated by the electromotive rotary drive of the at least one device for adjusting the delivery point of the material to be distributed onto the distribution member—includes a rotatably mounted floor of the container which is provided with the outlet opening, wherein the rotatable floor can have assigned thereto in particular thrust bearings for mechanically defining its angle of rotation.

The rotatable bearing arrangement of the floor of the container which is provided with the outlet opening, which performs in particular coaxially to the distribution members realized in the form of distribution disks, consequently provides for a displacement of the delivery point in the circumferential direction of the pivot axis of the floor or in the circumferential direction of distribution members in the form of distribution disks provided with throwing vanes in order to rotate the spread fans about the pivot axis of the floor in dependence on the desired spread pattern. The thrust bearings, present where applicable, can be formed, for example, by elongated holes realized on a stationary part, in which one or more pins rigidly secured directly or indirectly in the rotatable floor engage and in the end positions bear against the ends of the elongated hole. As an alternative to this, for the purposes of a similar displacement of the delivery point in the circumferential direction of the distribution disks, it can be provided that the displaceable functional part, actuated by the electromotive rotary drive, of the at least one device for adjusting the delivery point onto the distribution member—includes a sleeve which is arranged downstream of the metering member, is rotatably mounted coaxially with the distribution member, is arranged above the surface of the distribution member and comprises a radial delivery opening onto the distribution member.

As a result of rotating the sleeve by means of the electromotive rotary drive and consequently rotating the delivery opening thereof coaxially to the distribution disk, an extensive displacement of the delivery point is consequently produced once again. For the purposes of a displacement of the delivery point in the radial and/or the circumferential direction of the distribution disks, it can finally be provided as an alternative that the displaceable functional part, actuated by the electromotive rotary drive, of the at least one device for adjusting the delivery point onto the distribution member—includes a chute or channel which is arranged downstream of the metering member, is displaceable, and is in particular rotatably mounted, wherein the chute or channel is actuated once again by means of the electromotive rotary drive in such a manner that the exclusively rotational movement of its output shaft or of its transmission output shaft is transmitted to the chute or channel which is displaceable in a translatory or rotational manner.

For the structurally simple and robust transmission of the rotational movement of the output shaft induced by means of the rotary drive according to the invention or—if present— of the transmission output shaft to a pivoting movement of the rotatable floor or the rotatable sleeve or to a translatory or rotational movement of the displaceable chute or channel of the device for adjusting the delivery point of the material to be distributed onto the distribution member, it can preferably be provided that at least one lever is pivotally mounted in an eccentric manner on the rotatable floor which is provided with the outlet opening, on the rotatable sleeve which is provided with the delivery opening or on the displaceable chute or channel, which lever is pivotally mounted directly or where applicable via at least one further lever in an eccentric manner on the output shaft of the electromotive rotary drive or on the transmission output shaft. By means of such a lever or such a lever linkage which includes multiple levers, the exclusively rotational movement of the output shaft of the electromotive rotary drive or of the transmission output shaft can consequently be transmitted into a translatory or rotational movement of the functional part of the device for adjusting the delivery point avoiding any movement transmission means which are displaceable in a translatory manner along piston/cylinder units or adjustment spindles.

Insofar as the functional part of the device for adjusting the delivery point of the material to be distributed onto the distribution member is rotationally displaceable for its part and is consequently mounted so as to be rotatable or pivotable about an axis, to transmit the exclusively rotational movement of the output shaft of the electromotive rotary drive or of the transmission output shaft to the functional part avoiding any movement transmission means which are displaceable in a translatory manner along piston/cylinder units or adjustment spindles, it can be provided as an alternative to this or in addition to it that the rotatable floor which is provided with the outlet opening, the rotatable sleeve which is provided with the delivery opening or the rotatably mounted chute or channel is connected to the output shaft of the electromotive rotary drive or to the transmission output shaft by means of meshing gear wheels or by means of a belt drive, preferably in the form of a toothed belt drive.

The output shaft of the electromotive rotary drive or—if present—the transmission output shaft can be arranged in this connection, for example, substantially parallel to the rotational axis of the rotatable floor provided with the outlet opening, to the rotatable sleeve provided with the delivery opening or to the rotatable chute or channel which opens out on the distribution member, which, for example, opens up advantageous possibilities of connecting them together pivotably, in an operationally reliable and space-saving manner by means of only one lever, such as substantially in the form of a steering rod, or by means of only one belt drive.

In addition, the electromotive drive provided for actuating the functional part of the device for adjusting the delivery point onto the distribution member including the transmission which is assigned thereto when applicable can advantageously be arranged—in the central region of the distribution machine and/or—above the at least one lever which connects its output shaft or the transmission output shaft to the rotatable floor, to the rotatable sleeve or to the displaceable, in particular rotatable chute or channel in order to position it, on the one hand, in an as protected as possible manner from flying particles of the material to be distributed and to distance it, on the other hand, from the metering and distribution members including the drives thereof for reasons of space.

Insofar as the distribution machine includes two or more distribution members and is realized, for example, in the manner of a twin or multi-disk spreader, it can thus be provided, for example, that the distribution machine comprises at least two, in particular precisely two, outlet openings which are arranged on the floor of the container and each of which have arranged downstream a metering member and each of which have arranged downstream a distribution member which is arranged downstream of the metering member for distributing the material to be distributed on the floor, wherein the displaceable functional part, actuated by the electromotive rotary drive, of a respective device for adjusting the delivery point of the material to be distributed onto the distribution member includes in each case
- a rotatably mounted floor of the container provided with a respective output opening; or
- a rotatably mounted sleeve which is arranged downstream of a respective metering member and is provided with the delivery opening; or
- a displaceable, in particular rotatably mounted, chute or channel which is arranged downstream of a respective metering member.

Preferably, at least one lever can be pivotally mounted in this case, for example, in an eccentric manner on each rotatable floor, on each rotatable sleeve or on each displaceable, preferably rotatable chute or channel, which lever is pivotally mounted directly or via at least one further lever in an eccentric manner on the output shaft of at least one electromotive rotary drive or of at least one transmission output shaft in order to transmit the exclusively rotational rotary movement of the output shaft of the electromotive rotary drive or of the transmission output shaft to the respective functional part thereof avoiding any movement transmission means which are displaceable in a translatory manner along piston/cylinder units or adjustment spindles.

In the case of such a distribution machine which is designed in particular in the manner of a twin disk spreader, it is, for example, conceivable that
- each rotatable floor, each rotatable sleeve or each rotatable chute or channel is connected to an own electromotive rotary drive, in particular by means of at the at least one lever, in order to adjust the delivery point as a result of rotating a respective floor, a respective sleeve or a respective chute or channel independently of one another; or
- at least two rotatable floors, two rotatable sleeves or two rotatable or channels are connected, in particular by means of in each case at least one lever, to one common electromotive rotary drive in order to adjust the delivery point as a result of rotating the floors, the sleeves or the chutes or channels together at the same time.

With reference to a possible structural design of the lever linkage in the case of the last alternative, reference is made as an example to EP 2 057 876 A1 which was quoted in the introduction.

Further features and advantages of the invention will be apparent from the following description of exemplary embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
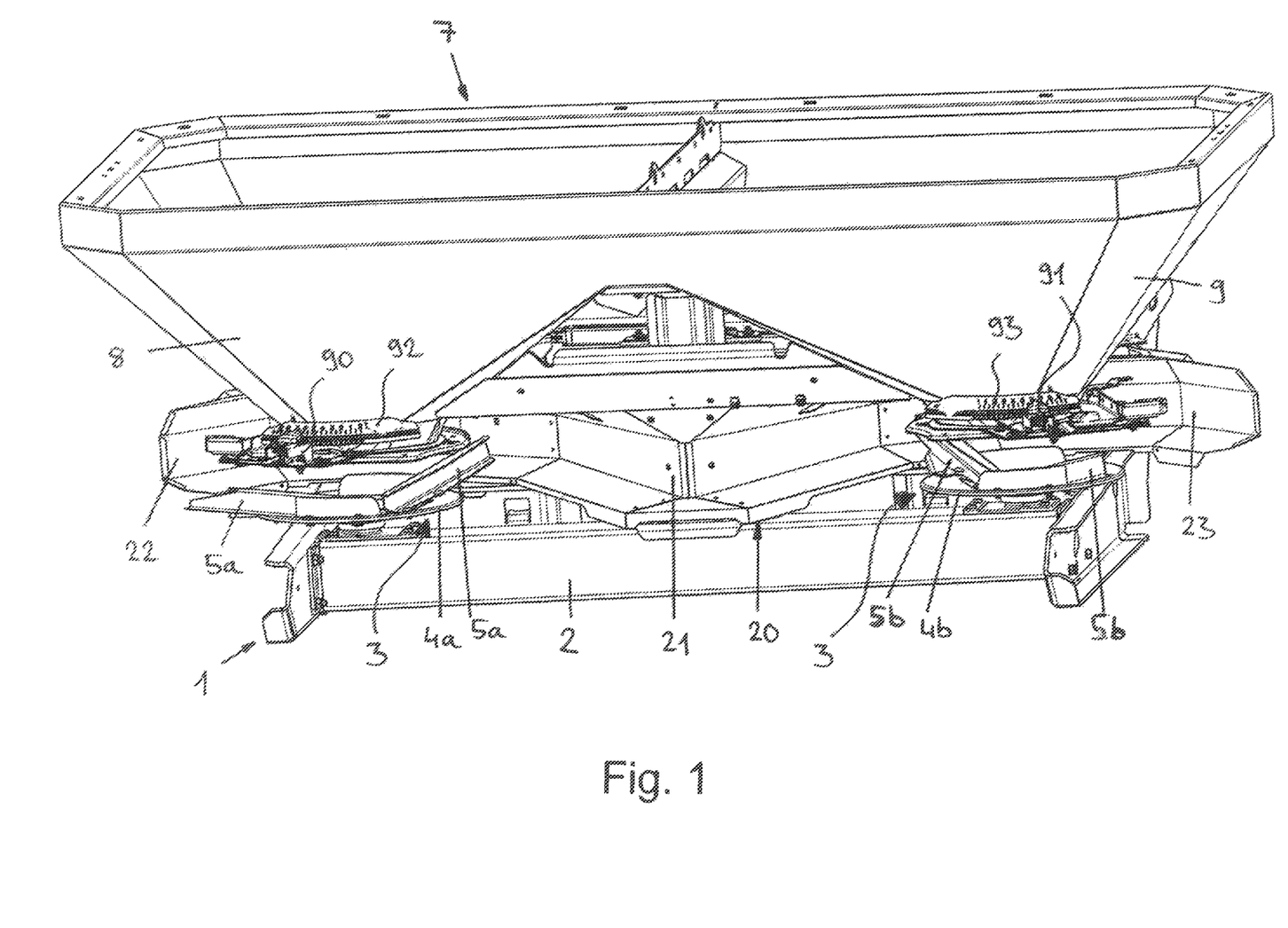
FIG. 1 is an oblique rear view of a schematic perspective view of a distribution machine realized in the form of an agricultural twin disk spreader.

Referring to the drawings, the distribution machine reproduced in FIG. 1 in the form of a twin disk spreader for agricultural purposes comprises a frame 1 with a crossbeam 2 which in the event of a mechanical drive of the distribution members 3 diverted from the power take-off shaft of a towing machine, such as a tractor, receives a transverse drive, whilst in the event of a speed-regulatable hydraulic or in particular electric drive (not shown) the hydraulic or electric motors assigned to each distribution member 3 can be secured to the crossbeam 2. The distribution members 3 are realized in the form of distribution disks 4*a*, 4*b* which are provided in the usual manner with throwing vanes 5*a*, 5*b*.

The distribution machine additionally comprises a container 7 which serves for storing the material to be distributed, such as in particular fertilizer or seed material, and which in the present case includes two container parts 8, 9 which taper downward in an approximately funnel-shaped manner and at the bottom end each merge into a bottom part 10, 11 which is, for example, substantially polygonal in form with a floor ring 12, 13 (cf. FIGS. 2 to 5). Directly below a respective floor ring 12, 13 is arranged in each case a floor 14, 15 with an outlet or metering opening 16, 17 (cf. FIGS. 2 to 5 once again), the free cross section of which is able to be opened and closed in an electromotive manner by means of a functional part, which is displaceable—here rotationally—and can be seen best in FIGS. 3 to 5, in the form of a metering slide 18 of a metering member for adjusting the desired mass flow of a material to be distributed between a closed position (FIG. 4) and a completely open position (FIG. 2) and arbitrary partial open positions (FIGS. 2 and 5). The metering slide 18, which interacts with a respective outlet opening 16, 17, is situated, in this case, once again directly below a respective floor 14, 15 provided with the outlet opening 16, 17 and is pivotally mounted hereon about an approximately vertical axis D (cf. FIGS. 3 to 5).

As can be seen once again from FIG. 1, the distribution machine can be provided additionally with a distribution disk protection 20 which surrounds the distribution disks 4*a*, 4*b* with the throwing vanes 5*a*, 5*b* in part. In the present case, it consists of multiple interconnected sheet sections, from which a central section 21 is arranged between the distribution disks 4*a*, 4*b* and the container parts 8, 9, in particular the bottom parts 10, 11 thereof, and a further arcuate section 22, 23 surrounds each of the distribution disks 4*a*, 4*b* in their front region—when viewed in the direction of travel.

Figure 2:
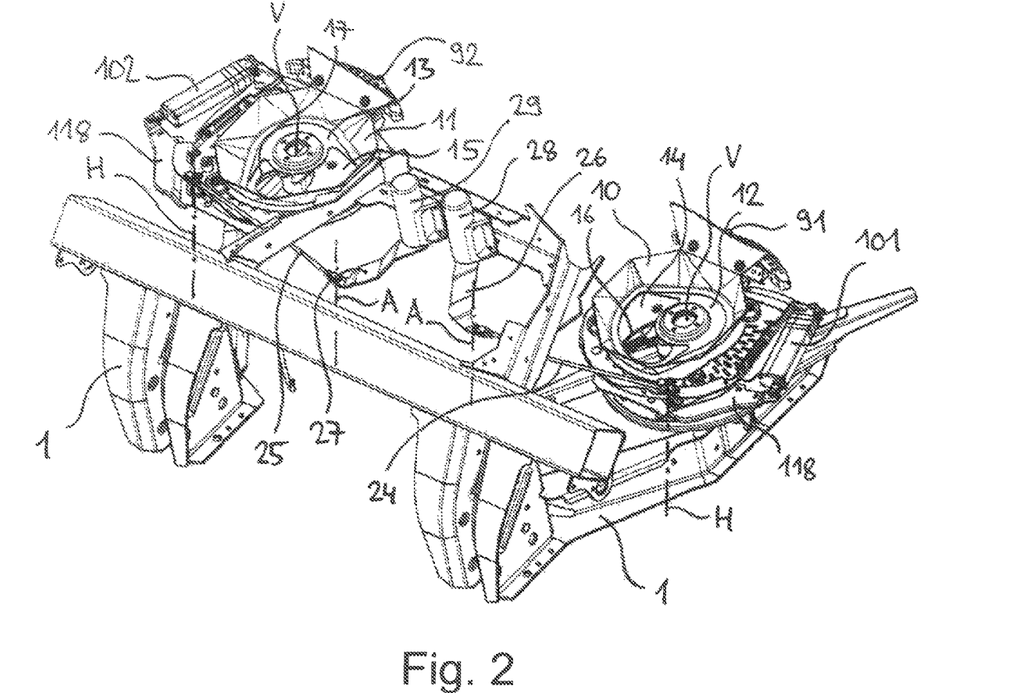
FIG. 2 is a schematic perspective view of a detail of part of the support frame arranged below the container of the distribution machine according to FIG. 1, including the metering members, the distribution members and the devices for adjusting the delivery point of the material to be distributed onto the distribution members.

As can be seen in FIG. 2, a respective distribution member 3 in the form of the distributor disks 4*a*, 4*b* has associated therewith a device for adjusting the delivery point of the material to be distributed onto the same which includes as a displaceable—here rotationally—functional part, a respective floor 14, 15 of the container parts 8, 9 of the container 7 which is provided with the outlet opening 16, 17 and is rotatably mounted. The rotatable bearing arrangement of the floor 14, 15, which for the rest is not shown in detail, is effected in the present case coaxially to the substantially perpendicular rotational axis V of the distribution disks 4*a*, 4*b* such that the metering or outlet opening 16, 17 can be displaced along a circular path by a circumferential portion around the distribution disk 4*a*, 4*b*, as a result of which the delivery point is adjustable in the circumferential direction of the distribution disk 4*a*, 4*b*. To actuate a respective rotatable floor 14, 15 independently of one another—i.e. the delivery point onto a respective distribution disk 4*a*, 4*b* can be changed modified independently of one another—a lever 24, 25 is pivotally mounted on each of the rotatable floors 14, 15 in an eccentric manner with reference to the rotational axis V of the floor 14, 15, about an axis H which extends parallel to the rotational axis V of the floor 14, 15, that is to say once again approximately vertically. The levers 24, 25, in the present case are realized substantially in the form of steering rods and extend from their bearing arrangement on the respective rotatable floor 14, 15 to the axis H especially inward in the direction of the center. On their end remote from a respective rotatable floor 14, 15, the levers 24, 25 are each mounted so as to be pivotable on a further lever 26, 27, once again about an approximately vertical axis A.

Each further lever 26, 27 sits non-rotatably on each axially fixed transmission output shaft, which cannot be seen in FIG. 2, of each transmission which is not visible in FIG. 2 either and continues to extend from here in the radial direction—and in the present case also inclinedly downward—such that the axis A, serving for the bearing arrangement of the lever 24, 25 on the further lever 26, 27, is arranged eccentrically with reference to the transmission output shaft. Each transmission is once again arranged downstream of each electromotive rotary drive 28, 29 which comprises an electric motor, the output shaft of which, also axially fixed, (not visible in FIG. 2) being connected to a transmission output shaft of a respective transmission. The respective transmission, in this case, is arranged, for example, below a respective electromotive rotary drive 28, 29 and shares a common housing with the latter, the transmission output shaft carrying a respective further lever 26, 27, being sealed against the housing, for example, by means of a mechanical seal. The transmission can be, for example, planetary gearing which includes a sun gear which sits on the output shaft of the electromotive rotary drive 28, 29 and has a small diameter, which sun gear engages a planetary gear which sits on the transmission output shaft and has a comparatively large diameter, the output shaft of the electromotive rotary drive 28, 29 and the transmission output shaft being arranged in particular approximately parallel such that there is a parallel arrangement of the transmission output shaft with reference to the rotational axis V of the rotatable floor and to the axes A, H of the lever 24, 25. The electromotive rotary drives 28, 29 including their transmission and the lever 24, 26; 25, 27, in this case, are arranged substantially in the center of the distribution machine between the distribution members such that when viewed from the rear corresponding to the view according to FIG. 1—they are positioned behind the throwing disk protection 21 with its center portion 19 and are consequently protected from dust and particles of the material to be distributed centrifuged off by the distribution disks 4a, 4b. By means of the levers 24, 26; 25, 27, the exclusively rotational movement of the transmission output shaft is consequently transmitted to the functional parts, designed as rotatable floors 14, 15, of the device for adjusting the delivery point without any linear drives, such as adjustment spindles or in particular piston/cylinder units, being used. In place of the levers 24, 26; 25, 27 it is also conceivable, for example, to provide a belt drive, such as a wedge—or in particular a toothed belt drive, or meshing gear wheels (or, for example, also only a single gear wheel sitting on a respective transmission output shaft which engages with a toothing, complementary hereto, on a circumferential portion of a respective rotatable floor 14, 15), which operatively connect the transmission output shaft to the rotational axis V of the rotatable floors 14, 15 of the device for adjusting the delivery point (not shown).

As explained in more detail further below with reference to the electromotive rotary drives of the distribution members, the electromotive rotary drives 28, 29 of the device for adjusting the delivery point of the material to be distributed onto a respective distribution disk 4a, 4b are also provided, in the manner of servomotors, with position detection sensors (not shown in FIG. 2) which detect the precise angle of rotation and/or the number of revolutions of the output shaft, of the transmission output shaft or of another shaft of the transmission. The sensors are once again operatively connected to a control and/or regulating device of the distribution machine in order to control and/or to regulate the delivery point depending on the spread pattern and in dependence on the position of the distribution machine on the field during spreading, for example detected by means of GPS. Apart from this, the electromotive rotary drives 28, 29 and also the electromotive rotary drive 28a of the metering member (cf. this to further below) can include, for example, brushless DC motors.

Figure 3:
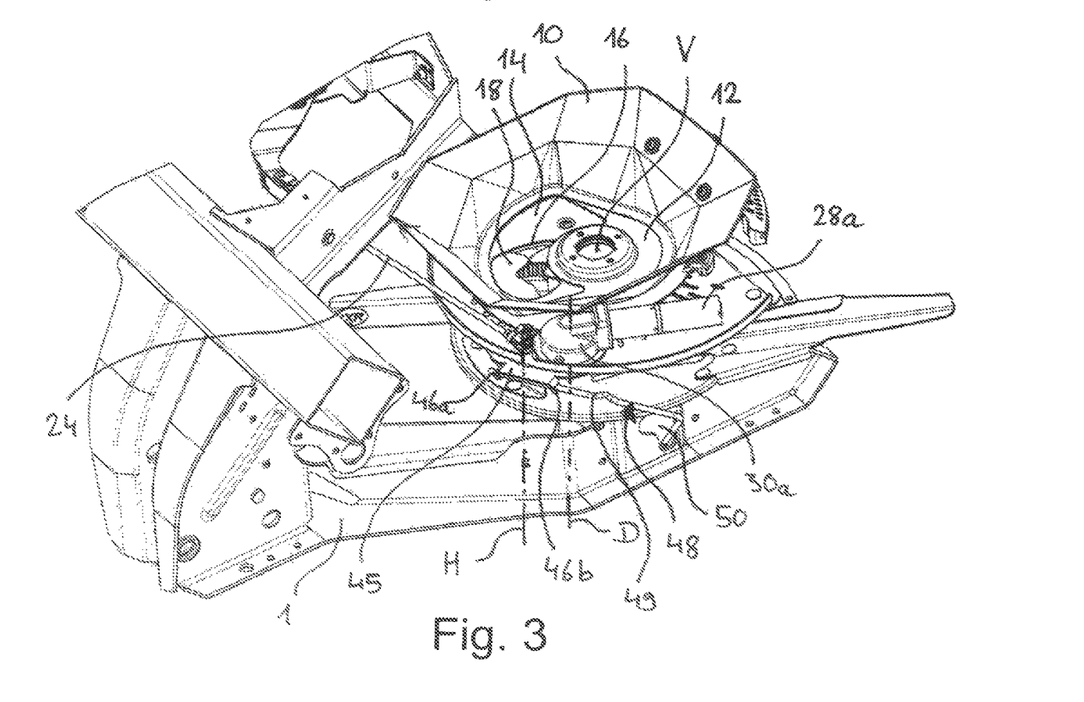
FIG. 3 is a schematic perspective view of a detail of a metering member of the distribution machine according to FIG. 1 with a first realization variant of a drive mechanism of the metering slide.
Figure 4:
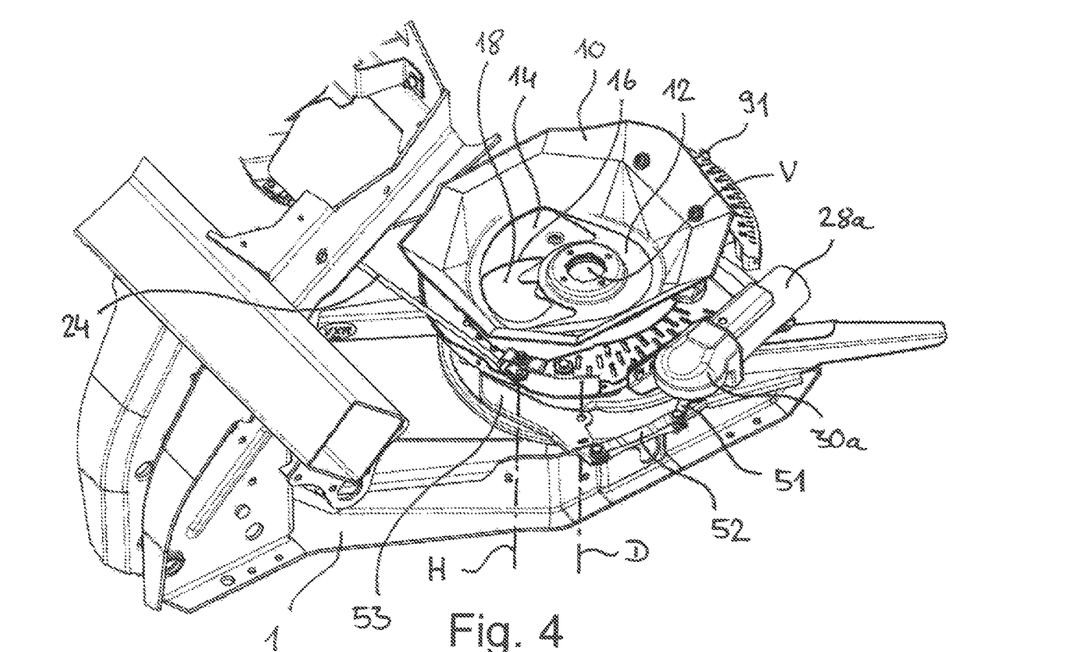
FIG. 4 is a schematic perspective view of a detail of a metering member of the distribution machine according to FIG. 1 with a second realization variant of a drive mechanism of the metering slide.
Figure 5:
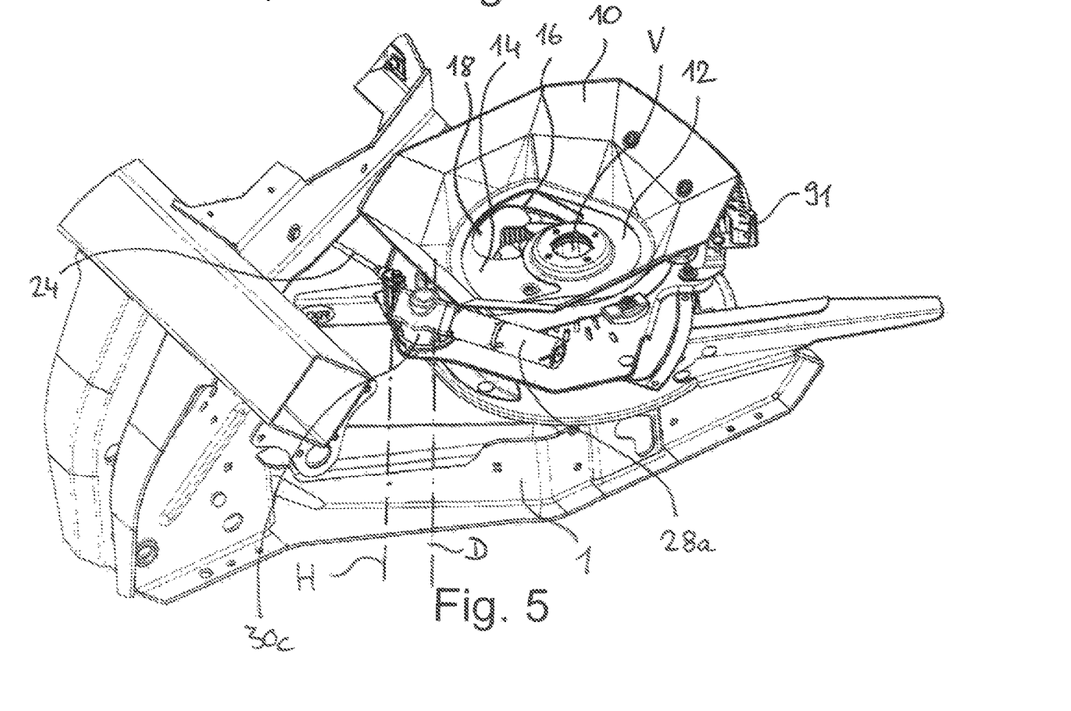
FIG. 5 is a schematic perspective view of a detail of a metering member of the distribution machine according to FIG. 1 with a third realization variant of a drive mechanism of the metering slide.

Whilst the metering slide 118, which is pivotable about an approximately perpendicular axis D, of the metering member in the case of the embodiment reproduced in FIG. 2 is actuated in a conventional manner between a closed position and its open positions by means of an electric cylinder 101, 102, the piston rod of which is pivotally mounted, on the one hand, on the metering slide 118 and the cylinder of which, on the other hand, is pivotally mounted on the rotatable floor 14, 15 of the distribution machine, various realization variants of drive mechanisms of the metering slide 18 which also use an electromotive rotary drive according to the invention can be found in FIGS. 3 to 5.

Thus, it proceeds from FIG. 3 that the metering slide 18, pivotable about the pivot axis D, of the metering member is actuated between its closed position and an arbitrary, completely or partially open position by means of an electromotive rotary drive 28a with a transmission 30a arranged downstream thereof, the housing of which is secured on the rotatable floor 10 outside the bottom part 10 of the container part 8 of the container 7 (cf. FIG. 1). In the case of the realization variant shown in FIG. 3, the transmission 30a is formed by an angular gearing which only requires a very small installation space, the transmission output shaft 37 of which is arranged coaxially to the pivot axis D of the metering slide 18 (see FIGS. 6 and 7; not shown in FIG. 3).

Figure 6:
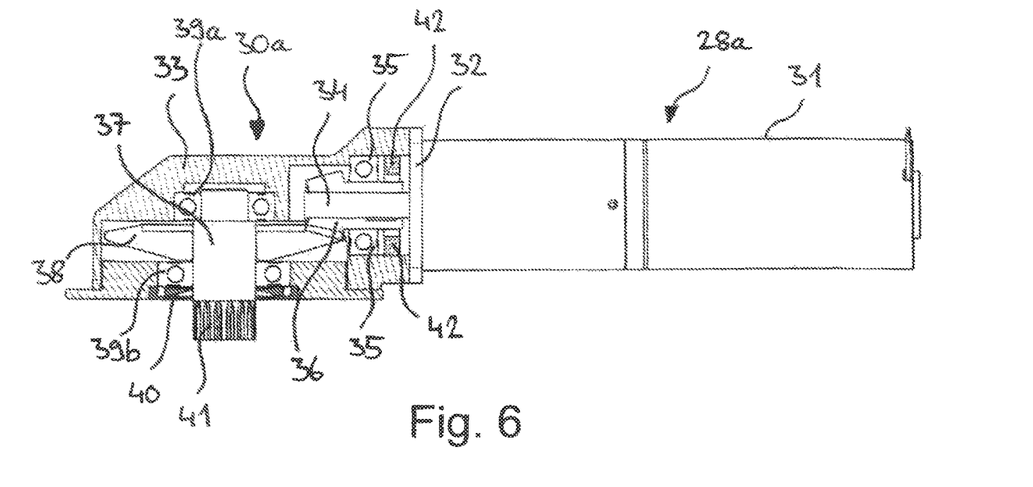
FIG. 6 is a schematic sectional view of an embodiment of an electromotive rotary drive including a transmission of the metering member according to FIGS. 3 and 4 arranged downstream of said electromotive rotary drive.
Figure 7:
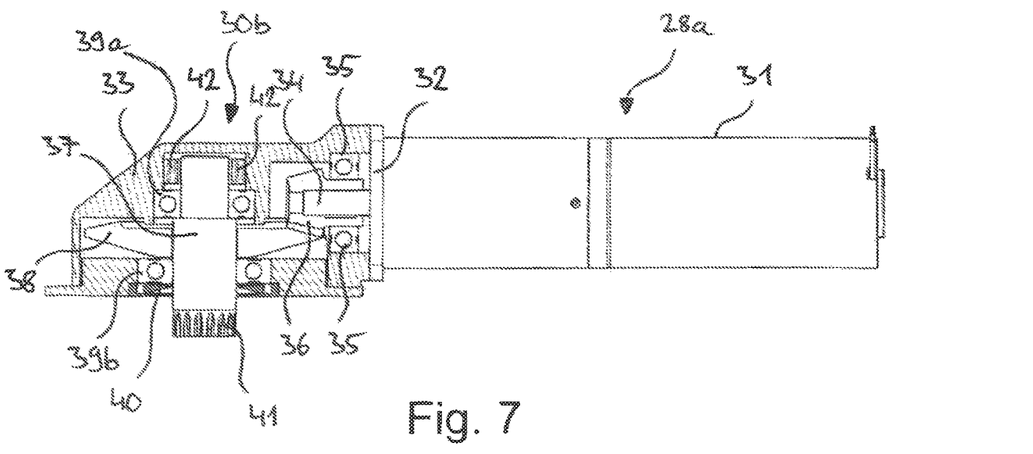
FIG. 7 is a sectional view corresponding to FIG. 6 of an embodiment of an electromotive rotary drive which is slightly modified compared thereto including a transmission of the metering member according to FIGS. 3 and 4 arranged downstream of said electromotive rotary drive.

FIGS. 6 and 7 reproduce possible realization variants of the electromotive rotary drive 28a including the transmission 30a thereof. The electromotive rotary drive 28a, in this case, comprises an electric motor received in a housing 31, the housing 31 includes a housing flange 32, on which the transmission housing 33 of the transmission 30a is secured in a dust-tight and liquid-tight manner. An output shaft 34 of the electromotive rotary drive 28a penetrates the housing flange 32 and consequently projects into the interior of the transmission housing 33, where it is mounted by means of roller bearing 35. A bevel gear 36 with a small diameter sits non-rotatably in the region of the free end of the output shaft 34, which meshes with a bevel gear 38 which sits non-rotatably on the transmission output shaft 37—here arranged at an angle of approximately 90° with reference to the output shaft 34—with a comparatively large diameter. The transmission output shaft 37, mounted in the transmission housing 33 also by means of roller bearings 39a, 39b, penetrates the transmission housing 33 and is sealed against the latter by means of a mechanical seal 40 in a dust-tight and liquid-tight manner. On its free end, the transmission output shaft 37 is provided with a suitable profiling 41, by means of which it can be connected non-rotatably to the pivot axis D of the metering slide 18 of the metering member (cf. FIG. 3). A position detection sensor 42 is additionally accommodated in the transmission housing 33, which position detection sensor is arranged in the realization variant in FIG. 6 on the circumference of the output shaft 34 of the electromotive rotary drive 28a and, for example, includes inductance transmitters which, in the manner of an angle sensor, are able to detect the precise angular position of the output shaft 34 or with consideration to the reduction ratio of the transmission 33—of the metering slide 18 which can be connected non-rotatably to the transmission output shaft 37. The position detection sensor 42 is also operatively connected to the control and/or regulating device of the distribution machine in order to adjust the desired metering quantities and in particular to regulate by way of the actual mass flow of material to be distributed (not shown) which has also been detected by sensors.

The realization variants, with slight modifications compared to this, of the electromotive rotary drive 28a including the transmission 30b according to FIG. 7 differ from that in FIG. 6 principally by the arrangement of the position detection sensor 42, which is arranged here on the output shaft 34 of the electromotive rotary drive 28a, but directly on the circumference of the transmission output shaft 37 such that the angular position it detects corresponds directly to that of the metering slide 18 of the metering member. For the rest, identical components and components having the same function are provided with the same reference symbols as in FIG. 6.

The electromotive rotary drive 28a and the position detection sensor 42—just as the electromotive rotary drives 28, 29 and the position detection sensors thereof of the device for adjusting the delivery point of the material to be distributed onto the distribution members according to FIG. 2—can be connectable to the power supply of the towing machine expediently via an electric interface (not shown) provided on the distribution machine itself or on a towing machine, such as, for example, a tractor, such that the distribution machine itself does not require its own power supply, but is supplied with electric energy from the onboard power system of the towing machine.

Apart from this, it is possible to see in FIG. 3 in the region of the front left-hand (in the Figure) circumferential portion of the metering slide 18, a plate 45 which extends approximately tangentially hereto and is arranged eccentrically with reference to the pivot axis D of the metering slide 18, on each of the ends of which—when viewed in the direction of extension of the plate 45 or in the circumferential direction of the metering slide 18—each bent-down portion is provided with a bore 46a, 46b. The aligned bores 46a, 46b of the plate 45 serve, when needed, for the manual insertion of a handle 48 which is formed, for example, substantially by an operating lever 49 with an external cross section which corresponds approximately to the internal cross section of the bores 46a, 46b or with an external cross section that is somewhat smaller in comparison and a hand grip 50 arranged on the free end of the operating lever 49. In this way, the metering slide 18 of the metering member is able to be closed manually by means of the handle 48 if a fault should occur during field work in the metering member, the electromotive rotary drive 28a of the same or the electric power supply thereof in order to be able to remove the distribution machine without losing any material to be distributed. Meanwhile, it is obviously also conceivable for the handle 48 to be arranged rigidly on the metering slide 18 and to be screw-connected there for example (not shown).

The realization variant reproduced in FIG. 4 of a drive mechanism of the metering slide 18, where an electromotive rotary drive unit 28a, which corresponds largely to the drive mechanism according to FIG. 3, with a transmission 30a, 30b according to FIG. 6 or 7 can be used, differs from that of FIG. 3 in particular in that the transmission output shaft 37 (cf. FIGS. 6 and 7) is not arranged coaxially to the pivot axis D of the metering slide 18, but parallel and laterally offset to the same, the electromotive drive unit 28a once again being fastened, for example screw-connected, for example via the housing 33 of its transmission 30a, on the rotatable floor 14 outside the bottom part 10 of the container 7. An entrainment arm 51, which extends substantially radially hereto, is non-rotatably fastened on the transmission output shaft 37 (cf. FIGS. 6 and 7) in this case, on the free end of which, that is to say eccentrically with reference to the transmission output shaft 37 (FIGS. 6 and 7) a lever 52 is pivotally mounted, for example about an approximately vertical pivot axis parallel to the transmission output shaft 37 and parallel to the pivot axis D of the metering slide 18 of the metering member. The lever 52 is pivotally mounted on its end opposite the entrainment arm 51—once again about an approximately vertical pivot axis—on a continuation 53 which protrudes approximately radially outward from the metering slide 18, once again eccentrically with reference to the pivot axis D of the metering slide 18. If the entrainment arm 51 sitting on the transmission output shaft 37 is consequently moved by means of the electromotive rotary drive unit 28a along the portion of a circular path, the lever 52 thus actuates the continuation 53, which is fastened rigidly on the metering slide 18 or is realized in one piece with said metering slide, such that the metering slide 18 is able to be moved about its pivot axis D into its closed position or an arbitrary open position. Such a design can be used in particular, if not exclusively, in the case of very tight installation space when the electromotive rotary drive 28a with its transmission 30a, 30b cannot be positioned or can only be positioned incurring uneconomic structural expenditure into the region of the pivot axis D of the metering slide 18. In place of the lever 52, it is, for example, also conceivable to provide a belt drive, such as a wedge—or in particular a toothed belt drive, or meshing gear wheels (or, for example, also only one gear wheel sitting on the transmission output shaft which engages with a toothing, complementary hereto, on a circumferential portion of the metering slide 18), which operatively connect the transmission output shaft 37 to the rotational axis D of the metering slide 18 (not shown).

A further possibility to tackle said problem of a very tight installation space, rendering the lever 52 according to FIG. 4 unnecessary, is produced from the realization variant of a drive mechanism of the metering slide 18 of the metering member reproduced in FIG. 5 where the electromotive rotary drive 28a is fastened once again via the housing of its transmission 30c on the rotatable floor 14 in such a manner that its transmission output shaft 71 (cf. FIGS. 8 to 10) is arranged coaxially to the pivot axis D of the metering slide 18 such that the structural design corresponds largely to that according to FIG. 3. Furthermore, common to all the embodiments in FIGS. 3 to 5 is admittedly that the exclusively rotational movement of the transmission output shaft 71 is transmitted to the functional part of the metering devices which is designed as a pivotable metering slide 18 without any linear drives, such as adjustment spindles or in particular piston/cylinder units being used.

Figure 8:
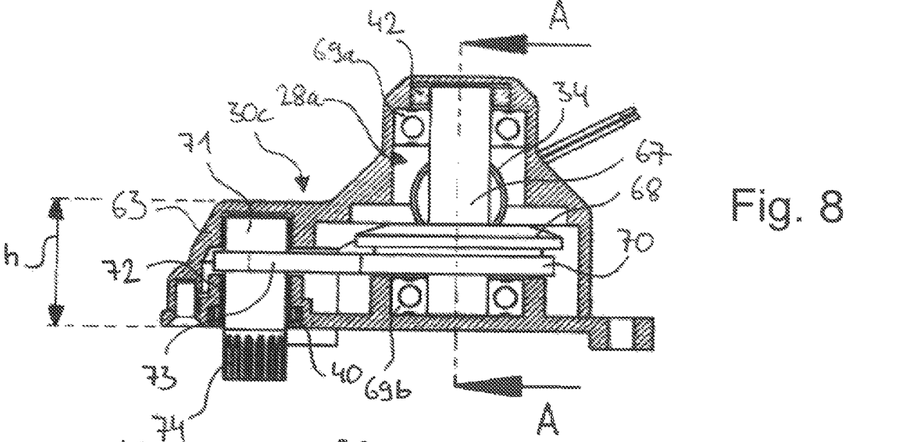
FIG. 8 is a schematic sectional view of an embodiment of an electromotive rotary drive including a transmission of the metering member according to FIG. 5 arranged downstream of said electromotive rotary drive corresponding to the cutting plane B-B in FIG. 9.
Figure 9:
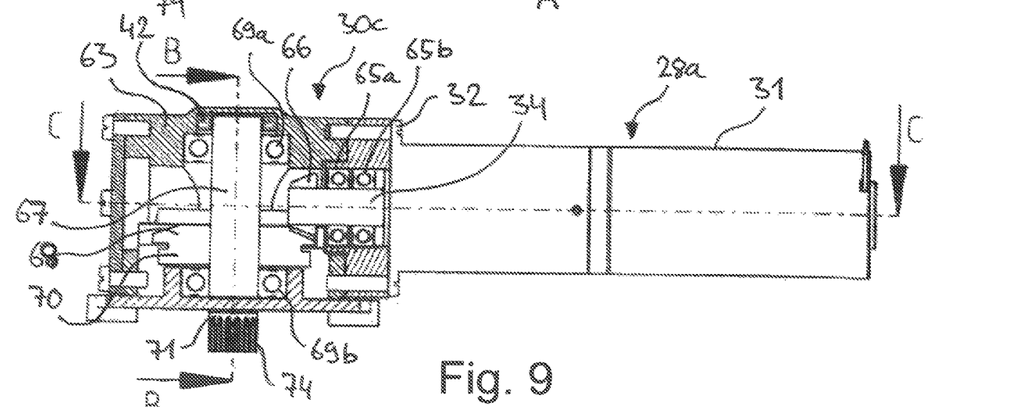
FIG. 9 is a schematic sectional view of the electromotive rotary drive including a transmission according to FIG. 8 corresponding to the cutting plane A-A in FIG. 8.
Figure 10:
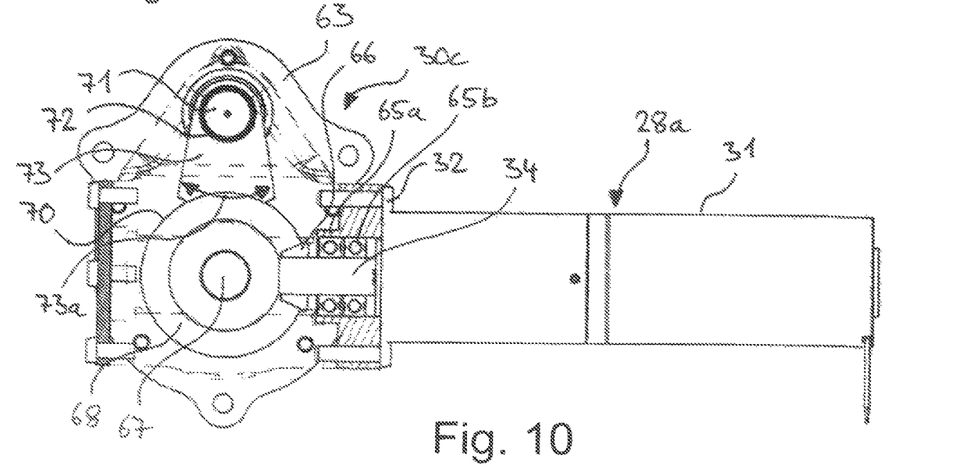
FIG. 10 is a schematic sectional view of the electromotive rotary drive including a transmission according to FIGS. 8 and 9 corresponding to the cutting plane C-C in FIG. 9.

In the realization variant according to FIG. 5, however, a transmission 30c which is modified in comparison to this is used in place of the pure angular gearing 30a, 30b according to FIG. 6 or 7, as is shown schematically in FIGS. 8 to 10, the electromotive rotary drive 28a itself being able to be the same and being provided in FIGS. 8 to 10 with the same reference symbols. As this shows, the transmission 30c is designed in the manner of combined angle/planetary gearing, the transmission housing 63 of which is once again secured on the housing flange 32 of the electromotive rotary drive 29a in a dust-tight and liquid-tight manner. The output shaft 34 of the electromotive rotary drive 28a penetrates the housing flange 32 and projects into the interior of the transmission housing 63, where it is mounted by means of roller bearings 65a, 65b. A bevel gear 66 with a small diameter sits non-rotatably in the region of the free end of the output shaft 34, which meshes with a bevel gear 68 which sits non-rotatably on the intermediate shaft 67—here arranged at an angle of approximately 90° with reference to the output shaft 34—with a comparatively large diameter. A sun wheel 70, which in the present case is designed in one piece with the bevel gear 68 but can obviously also be formed by a separate gear wheel, also sits non-rotatably on the intermediate shaft 67, which is mounted in turn in the transmission housing 63 by means of roller bearings 69a, 69b. The transmission output shaft 71, which in the present case for reasons of space is mounted in the transmission housing 63 by means of a sliding bearing 72, but can obviously also be mounted in principle by means of a roller bearing (not shown), extends parallel to the intermediate shaft 67 and meshes with the sun gear 70 thereof by means of a planetary gear section 73 which is best seen in FIG. 10 and sits non-rotatably on the transmission output shaft 71. The planetary gear section 73 has a substantially circle sector-shaped form and extends via an arc 73a (cf. FIG. 10) which corresponds at least with the pivot angle which is necessary in order to pivot the metering slide 18 (cf. FIG. 5) back and forth between a completely closed position and its completely open position. In this way, the transmission output shaft 71 is able to be positioned very close to an edge of the transmission housing 63, which can also comprise a reduced installation height h in the region of the transmission output shaft 63, as a result of which it is also possible in the event of a very tight installation space to mount the transmission housing 63 on the rotatable floor 14 with a coaxial arrangement of its transmission output shaft 71 with reference to the pivot axis D of the metering slide 18 (once again cf. FIG. 5).

The transmission output shaft 71 also in the case of the design according to FIGS. 8 to 10 consequently penetrates the transmission housing 63 and is sealed against the latter by means of a mechanical seal 40 (cf. FIG. 8) in a dust-tight and liquid-tight manner. On its free end, the transmission output shaft 71 is once again provided with a suitable profiling 74, by means of which it can be connected non-rotatably to the pivot axis D of the metering slide 18 of the metering member (cf. FIG. 3). A position detection sensor 42 is additionally accommodated in the transmission housing 63, which position detection sensor is arranged in the present exemplary embodiment on the circumference of the intermediate shaft 67 and, for example, includes an inductance transmitter which is able, in the manner of an angle sensor, to detect the precise angular position of the intermediate shaft 67 or with consideration to the reduction ratio of the combination of sun gear 70 and planetary gear section 73—of the metering slide 18 which can be connected non-rotatably to the transmission output shaft 71. The position detection sensor 42 can also be arranged meanwhile, in principle, on the output shaft 34 of the electromotive rotary drive unit 28a (for example analogously to the design according to FIG. 6) or also—if sufficient installation space is available—on the transmission output shaft 71. In all cases, it is operatively connected to the control and/or regulating device of the distribution machine in order to adjust the desired metering quantities and in particular to regulate them by way of the actual mass flow of material to be distributed (not shown) which has also been detected by sensors.

Finally, it must be mentioned for the sake of completeness with reference to FIGS. 1 to 5 that a position display 90, 91 in the form of an indicator can be connected expediently to each rotatable floor 14, 15, which position display interacts with a graduation 92, 93 which is fixed in a stationary manner on a respective container part 8, 9 of the container 7 and is provided with a scale representing the position of the delivery point.

While specific embodiments of the invention have been shown and described in detail to illustrate the application of the principles of the invention, it will be understood that the invention may be embodied otherwise without departing from such principles.

The invention claimed is:
1. A distribution machine comprising:
   a support frame;
   at least one container carried by the support frame for receiving pulverent and/or particulate material to be distributed;
   at least one outlet opening which is arranged on a floor of the container;
   a metering member arranged downstream of the outlet opening;
   at least one distribution member arranged downstream of the metering member for distributing the material to be distributed on the ground;
   an electromotive rotary drive with an output shaft or a transmission with a transmission output shaft arranged downstream of the electromotive rotary drive, wherein at least one displaceable functional part of the metering member comprises at least one metering slide and/or at least one device for adjusting a delivery point of the material to be distributed onto the distribution member and the displaceable functional part is operatively connected to, and actuated by, the output shaft of the electromotive rotary drive or the transmission output shaft of the transmission such that the exclusively rotational movement of the output shaft or of the transmission output shaft is transmissible to the displaceable functional part, wherein the electromotive rotary drive is free of a telescopic drive means.

2. The distribution machine as claimed in claim 1, wherein the displaceable functional part is connected by a connection comprising:
   at least one lever, which is pivotally mounted eccentrically on the output shaft of the electromotive rotary drive or of the transmission output shaft,
   a non-rotatable connection to the output shaft or to the transmission output shaft so as to be pivotable about a pivot axis which is arranged coaxially to the output shaft of the electromotive rotary drive or to the transmission output shaft, or
   meshing gears or a belt drive to the output shaft or the transmission output shaft so as to be pivotable about a pivot axis which is arranged at a radial distance to the output shaft of the electromotive rotary drive or to the transmission output shaft.

3. The distribution machine as claimed in claim 1, wherein the displaceable functional part is mounted so as to be pivotable or rotatable about a pivot axis or a rotational axis.

4. The distribution machine as claimed in claim 1, wherein the electromotive rotary drive is received in at least one housing, wherein the housing is configured so as to be substantially dust-tight and liquid-tight; and/or the output shaft of the electromotive rotary drive is sealed against the housing by means of at least one mechanical seal.

5. The distribution machine as claimed in claim 1, wherein the transmission comprises coupling gearing, coaxial gearing, angular gearing and/or planetary gearing, which is operatively connected on the one hand to the output shaft of the electromotive rotary drive and the transmission output shaft thereof and on the other hand to the displaceable functional part.

6. The distribution machine as claimed in claim 1, wherein the output shaft of the electromotive rotary drive, the transmission output shaft or at least one other shaft of the transmission is provided with a position detection sensor comprising an angle sensor which is able to detect the angular position of the output shaft, of the transmission output shaft or of the at least one other shaft of the transmission, or a speed sensor which is able to detect the number of revolutions of the output shaft, of the transmission output shaft or of the at least one other shaft of the transmission, which is connected to a control and/or regulating device of the distributing device.

7. The distribution machine as claimed in claim 1, wherein the electromotive rotary drive is supplied with current by the electric power supply of a towing unit, wherein the electromotive rotary drive comprises an electric interface which is connectable to the electric power supply of the towing unit.

8. The distribution machine as claimed in claim 1, wherein the displaceable functional part, which is actuated by the electromotive rotary drive, in the form of the metering slide of the at least one metering member interacts with the outlet opening and is pivotable about a substantially vertical, pivot axis between a closed position, in which the metering slide closes the outlet opening completely, and a multitude of open positions in which the metering slide opens the outlet opening completely or in part.

9. The distribution machine as claimed in claim 8, wherein
   the metering slide is mounted so as to be pivotable on the floor of the container provided with the outlet opening and/or the electromotive rotary drive is secured directly or indirectly, by means of the transmission, to the floor of the container provided with the outlet opening.

10. The distribution machine as claimed in claim 8, wherein the output shaft of the electromotive rotary drive or the transmission output shaft is arranged substantially coaxially to the pivot axis of the metering slide or is arranged parallel to the pivot axis of the metering slide, wherein the output shaft of the electromotive rotary drive or the transmission output shaft is connected to the metering slide by means of at least one lever which is pivotally eccentrically mounted via meshing gear wheels or by means of a belt drive.

11. The distribution machine as claimed in claim 8, wherein the metering slide has assigned thereto a handle, arrangeable on the metering slide eccentrically to the pivot axis in order to be able to actuate the metering slide manually.

12. The distribution machine as claimed in claim 1, wherein:
the displaceable functional part, actuated by the electromotive rotary drive, of the at least one device for adjusting the delivery point of the material to be distributed onto the distribution member comprises:
a rotatably mounted floor of the container which rotatably mounted floor is provided with the outlet opening, wherein the rotatable floor has assigned thereto thrust bearings for mechanically defining an angle of twist.

13. The distribution machine as claimed in claim 12, wherein at least one lever is pivotally eccentrically mounted with reference to a lever rotational axis on the rotatable floor which is provided with the outlet opening, which lever is pivotally eccentrically mounted directly or via at least one further lever on the output shaft of the electromotive rotary drive or on the transmission output shaft.

14. The distribution machine as claimed in claim 12, wherein the rotatable floor which is provided with the outlet opening is connected to the output shaft of the electromotive rotary drive or to the transmission output shaft by means of meshing gear wheels or by means of a belt drive.

15. The distribution machine as claimed in claim 12, wherein the output shaft of the electromotive rotary drive or the transmission output shaft is arranged substantially parallel to the rotational axis of the rotatable floor provided with the outlet opening.

16. The distribution machine as claimed in claim 12, wherein the electromotive rotary drive is arranged in the central region of the distribution machine and/or above the at least one lever which connects the output shaft of the electromotive rotary drive or the transmission output shaft to the rotatable floor.

17. The distribution machine as claimed in claim 12, further comprising another metering member wherein the at least one distribution member comprises at least two distribution members and the at least one outlet opening comprises at least two outlet openings which are arranged on the floor of the container and which respectively have arranged downstream thereof said metering member or said another metering member and each of which have arranged downstream thereof the associated distribution member which is arranged downstream of the metering member for distributing the material to be distributed on the floor, wherein the displaceable functional part, actuated by the electromotive rotary drive, of a respective device for adjusting the delivery point of the material to be distributed onto the distribution member comprises a rotatably mounted floor of the container provided with a respective output opening, wherein at least one lever is pivotably mounted in an eccentric manner on each rotatable floor, which lever is pivotably eccentrically mounted directly or via at least one further lever on the output shaft of at least one electromotive rotary drive or of at least one transmission output shaft.

18. The distribution machine as claimed in claim 17, wherein each rotatable floor is connected to an associated electromotive rotary drive by means of at the at least one lever, in order to adjust the delivery point as a result of rotating a respective floor independently of one another; or at least two rotatable floors are connected, by means of in each case at least one lever, to one common electromotive rotary drive in order to adjust the delivery point as a result of rotating the floors together at the same time.

19. A distribution machine comprising:
a support frame;
a container carried by the support frame for receiving pulverent and/or particulate material to be distributed, the container comprising a floor, the floor comprising at least one outlet opening;
a metering member arranged downstream of the at least one outlet opening;
a distribution member arranged downstream of the metering member for distributing the material to be distributed on the ground;
a drive mechanism comprising an output shaft, wherein at least one displaceable functional part of the metering member comprises at least one metering slide and/or at least one device for adjusting a delivery point of the material to be distributed onto the distribution member and the displaceable functional part is operatively connected to, and actuated by, the output shaft, wherein the drive mechanism generates only a rotational movement of the output shaft, wherein movement of the displaceable functional part is based exclusively on the rotational movement of the output shaft, wherein the electromotive rotary drive is free of a telescopic drive means.

* * * * *